(12) United States Patent
Venable, Sr.

(10) Patent No.: US 11,228,452 B2
(45) Date of Patent: Jan. 18, 2022

(54) DISTRIBUTED CERTIFICATE AUTHORITY

(71) Applicant: Cisco Technology, Inc., San Jose, CA (US)

(72) Inventor: Jeffrey C. Venable, Sr., Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 280 days.

(21) Appl. No.: 16/571,981

(22) Filed: Sep. 16, 2019

(65) Prior Publication Data

US 2021/0083882 A1 Mar. 18, 2021

(51) Int. Cl.
*H04L 29/06* (2006.01)
*H04L 9/32* (2006.01)
*H04L 9/06* (2006.01)
*H04L 9/08* (2006.01)

(52) U.S. Cl.
CPC .......... *H04L 9/3268* (2013.01); *H04L 9/0637* (2013.01); *H04L 9/085* (2013.01); *H04L 9/0861* (2013.01); *H04L 9/3218* (2013.01); *H04L 9/3247* (2013.01); *H04L 9/3263* (2013.01); *H04L 2209/38* (2013.01)

(58) Field of Classification Search
CPC ..... H04L 9/3268; H04L 9/0861; H04L 9/085; H04L 9/3263; H04L 9/3218; H04L 9/3247; H04L 9/0637; H04L 2209/38; H04L 63/00; H04L 9/3239

See application file for complete search history.

(56) References Cited

U.S. PATENT DOCUMENTS

| | | |
|---|---|---|
| 10,102,265 B1 | 10/2018 | Madisetti et al. |
| 2008/0133906 A1* | 6/2008 | Parkinson ............. H04L 9/3236 713/156 |
| 2008/0285759 A1* | 11/2008 | Shaw ................... G06F 21/6218 380/278 |
| 2009/0313171 A1* | 12/2009 | Yacobi .................. H04L 9/3247 705/51 |
| 2010/0037056 A1* | 2/2010 | Follis .................... H04L 9/3271 713/171 |
| 2017/0295023 A1 | 10/2017 | Madhavan et al. |
| 2018/0004930 A1* | 1/2018 | Csinger ................. H04L 9/3234 |
| 2018/0137512 A1 | 5/2018 | Georgiadis et al. |
| 2018/0373776 A1 | 12/2018 | Madisetti et al. |
| 2019/0007205 A1* | 1/2019 | Corduan ............. G06Q 20/367 |

(Continued)

FOREIGN PATENT DOCUMENTS

WO 2019067798 A1 4/2019

*Primary Examiner* — Sher A Khan
(74) *Attorney, Agent, or Firm* — Patterson + Sheridan, LLP

(57) ABSTRACT

The present disclosure provides an approach for a certificate authority (CA) that is distributed among nodes of a network, such that only a portion of the network nodes are required to sign and issue a digital certificate. Each node of the network includes a partial private key, the partial private key having been obtained by sharding the full private key. The sharding may be performed by a process known in the art, such as Shamir Secret Sharing and Distributed Key Generation. Systems that are inherently distributed may use the techniques herein to create a CA that is not centralized. The techniques herein leverage a database in the form of a distributed blockchain to store issued certificates and status of the certificates.

11 Claims, 6 Drawing Sheets

(56) References Cited

U.S. PATENT DOCUMENTS

| | | |
|---|---|---|
| 2019/0018887 A1 | 1/2019 | Madisetti et al. |
| 2019/0018888 A1 | 1/2019 | Madisetti et al. |
| 2019/0020629 A1 | 1/2019 | Baird, III et al. |
| 2019/0146979 A1 | 5/2019 | Madisetti et al. |
| 2019/0220813 A1 | 7/2019 | Madisetti et al. |
| 2019/0228409 A1 | 7/2019 | Madisetti et al. |
| 2020/0213113 A1* | 7/2020 | Savanah ............... H04L 9/3073 |
| 2020/0213125 A1* | 7/2020 | Destefanis ............ H04L 9/3297 |
| 2020/0285720 A1* | 9/2020 | Alsolami .............. H04L 9/0861 |
| 2021/0142318 A1* | 5/2021 | Qian ....................... H04L 9/085 |

* cited by examiner

DISTRIBUTED CERTIFICATE AUTHORITY

TECHNICAL FIELD

Embodiments presented in this disclosure generally relate to a distributed certificate authority (CA). More specifically, embodiments disclosed herein related to a distributed CA that is implemented through and leverages a blockchain system.

BACKGROUND

A blockchain is a growing list of records or blocks connected using cryptographic techniques (i.e., hashes). A blockchain is composed of many copies or instances of the blockchain, and the copies are synchronized using a consensus mechanism. The blockchain is typically managed by a peer-to-peer network in which nodes follow a communication protocol and block validation protocol. Once a block is recorded on the blockchain, the data cannot be altered retroactively without alteration of all subsequent blocks, which requires consensus of other nodes in the blockchain network.

A traditional certificate authority (CA) is a centralized entity that issues and revokes a digital certificate. A digital certificate certifies the ownership of a public key. However, many systems today, such as blockchain systems, are distributed. A centralized CA on which trust depends may be inherently incompatible with distributed systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method and a computer readable medium of creating a distributed certificate authority (CA) on a network where the network includes a blockchain and at least a first node, a second node, and a third node. The method includes generating a private key and a public key of a private-public key pair by generating a first shard of the private key and storing the first shard on the first node, generating a second shard of the private key and storing the second shard on the second nod, and generating a third shard of the private key and storing the third shard on the third node.

Another embodiment presented in this disclosure is a computing system that includes a network that includes a blockchain and at least a first node, a second node, and a third node. The computing system also includes at least one processor programmed to carry out a method of creating a distributed certificate authority (CA) on the network. The method includes generating a private key and a public key of a private-public key pair by generating a first shard of the private key and storing the first shard on the first node, generating a second shard of the private key and storing the second shard on the second nod, and generating a third shard of the private key and storing the third shard on the third node.

Example Embodiments

The present disclosure provides an approach for a certificate authority (CA) that is distributed among nodes of a network, such that only a portion of the network nodes are required to sign and issue a digital certificate. Each node of the network includes a partial private key, the partial private key having been obtained by sharding the full private key. The sharding may be performed by a process known in the art, such as Shamir Secret Sharing and Distributed Key Generation. Systems that are inherently distributed may use the techniques herein to create a CA that is not centralized. The techniques herein leverage a database in the form of a distributed blockchain to store issued certificates and status of the certificates.

Figure 1:
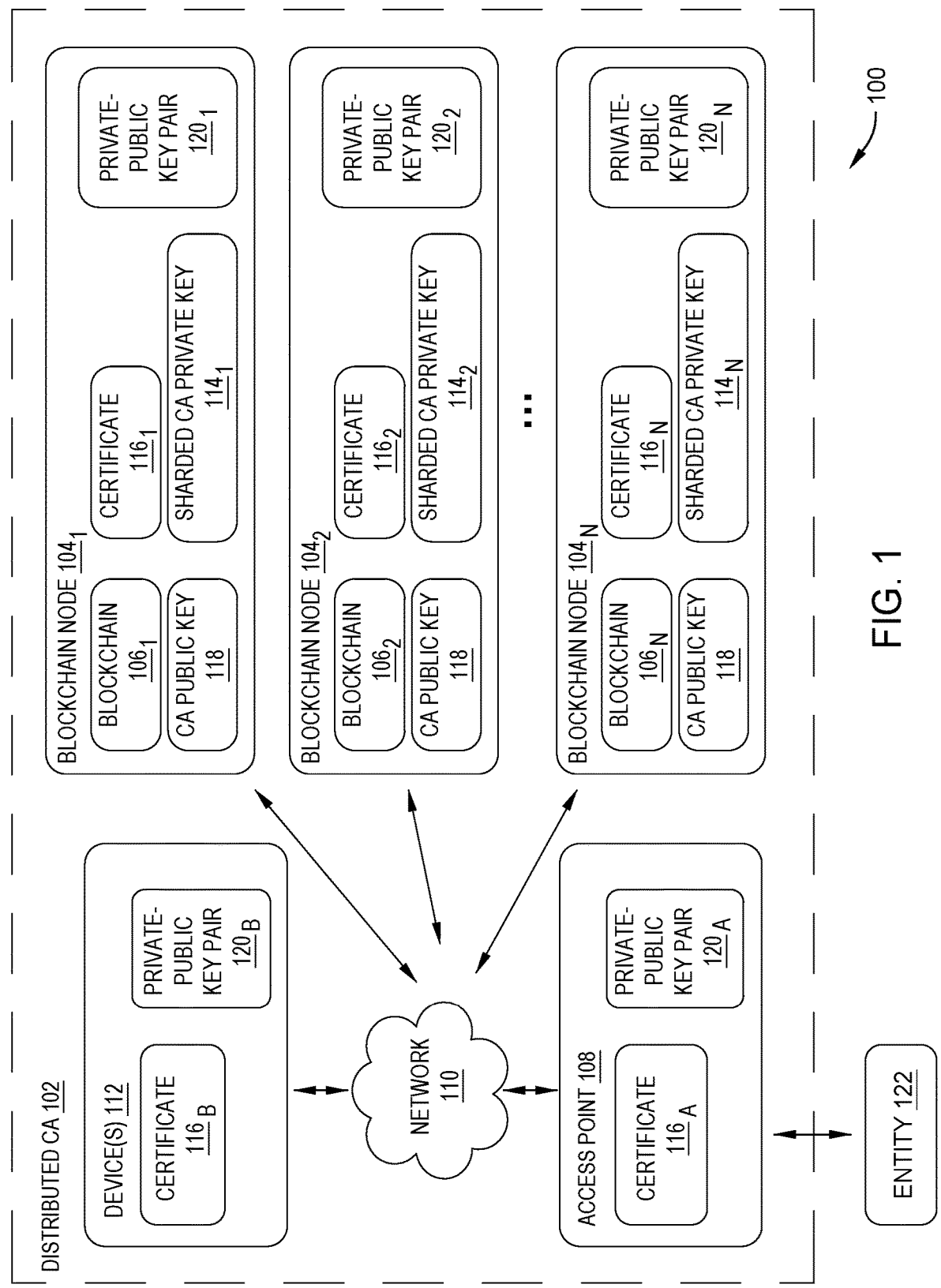
FIG. 1 depicts a block diagram of a computing system in which one or more embodiments of the present disclosure may be utilized.

FIG. 1 depicts a block diagram of a computing system 100 in which one or more embodiments of the present disclosure may be utilized. The computing system 100 includes a distributed CA 102 and one or more entities 122.

The entity 122 may be either a device that does not have a certificate 116, or may be a device that has a certificate 116 but has not logged into distributed CA 102. The entity 122 may be, for example, a desktop computer, mobile device, router, switch, firewall, a smart lightbulb, a specialty device, etc. When the entity 122 is issued a certificate 116 and entity 122 logs into the distributed CA 102, then the entity 122 may become one of devices 112 or one of blockchain nodes 104, as further described below.

The distributed CA 102 is a system that functions to issue, revoke, and manage digital certificates 116 used to authenticate physical and logical components of the system 100. The distributed CA 102 is a network that may operate on top of an existing network whose primary purpose may be a purpose other than that to issue, revoke, and manage digital certificates 116. For example, an existing network used to operate a business operation may be leveraged such that some of the physical devices on the network are used to perform the functions of the blockchain nodes 104, the devices 112, and the access point 108, which are further described below.

The distributed CA 102 includes a plurality of blockchain nodes 104, a plurality of devices 112, and an access point 108 connected by a network 110. Network 110 may include, for example, a direct link, a local area network (LAN), a wide area network (WAN), another type of network.

The access point 108 serves as a gateway and provides an interface between one or more entities 122 and distributed CA 102. Although the access point 108 is shown as a distinct component, the functions of the access point 108 may be performed by one of the blockchain nodes 104 or one of the devices 112.

The devices 112 may be regarded as components of distributed CA 102 that are not blockchain nodes 104. In an embodiment, the devices 112 are components of the distributed CA 102 that do not store a copy of blockchain 106. In a second embodiment, the devices 112 are components of the distributed CA 102 that do not have a sharded CA private key 114. A device 112 may be a desktop computer, mobile device, router, switch, firewall, smart lightbulb, specialty device, etc. Network 110 may comprise some or all of the devices 112.

Each component 104, 108, 112 of distributed CA 102 comprises a private-public key pair 120 and a certificate 116. Certificate 116 may be, for example, a certificate conforming to the X.509 certificate standard. Certificate 116 and private-public key-pair 120 are further described below with reference to FIGS. 3A and 3B.

The blockchain node 104 may be regarded as a component that is not one of devices 112. The blockchain node 104 manages an instance or copy of the blockchain 106 associated with that blockchain node 104. The blockchain node 104 is able to read and/or write to its copy of blockchain 106. The blockchain node 104 comprises a copy of the blockchain 106 on storage local to the blockchain node 104, or the blockchain node 104 is able to access blockchain 106 on another storage. The blockchain 106 is further described with reference to FIG. 2, below.

Each blockchain node 104 comprises a sharded CA private key 114 and optionally, a CA public key 118 associated with the sharded CA private key 114. CA public key 118 may be stored in a shared common location, or within a shared synchronized data structure such as on blockchain 106. Each sharded CA private key 114 is only accessibly by the blockchain node 104 that is associated with that sharded CA private key 114. CA public key 118 and sharded CA private key 114 are described with reference to FIGS. 3A and 3B, below. Each blockchain node 104 may be a computing device with hardware components such as a processor, a memory, and a storage.

Figure 2:
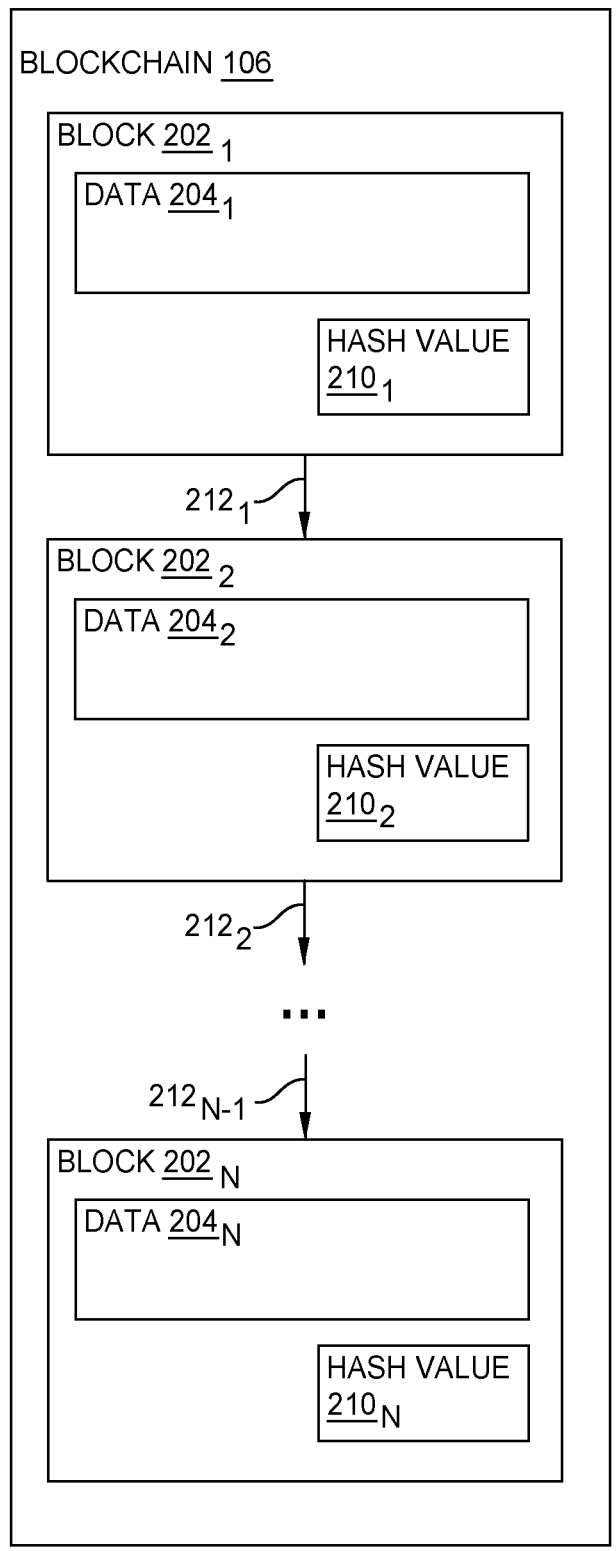
FIG. 2 depicts a block diagram of an exemplary distributed blockchain, according to an embodiment.

FIG. 2 depicts a block diagram of an exemplary distributed blockchain 106, according to an embodiment. Blockchain 106 is a distributed data structure, a copy of which is located at blockchain node 104. As used herein, a "copy" of distributed blockchain 106 may be a full copy or a partial copy. The locations of copies of blockchain 106 may be memory or storage locations associated with blockchain nodes 104.

Each copy of blockchain 106 is synchronized with other copies within the blockchain network using a consensus mechanism. The consensus mechanism may be, for example, proof-of-elapsed-time, simplified *byzantine* fault tolerance, proof-of-work, proof-of-stake, proof-of-authority, or another mechanism. The consensus mechanism decides which of differing versions of blockchain 106 is the correct version, and all copies of blockchain 106 are synchronized to the agreed-upon version. The consensus mechanism provides security to the blockchain network. For example, if a malicious entity tampers with one copy or a few copies of the blockchain 106, the tampered (modified by malicious entity) copies are discarded and the untampered (unmodified by malicious entity) copies are used by distributed CA 102.

The blockchain 106 is a data structure used for storage of data. The blockchain 106 comprises one or more data blocks 202 connected by pointers 212. Each block 202 comprises data 204, a hash value 210, and a pointer 212. The data 204 may comprise various types of information, such as that described with reference to FIGS. 3A, 4, and 5, below.

The hash value 210 is an output of a hash function, such as secure hash algorithm (SHA)-3, SHA-256, or Keccak256. The hash value 210 of the first block (i.e., block $202_1$) of the blockchain 106 results from hashing input that comprises data $204_1$. The hash value 210 of all subsequent blocks (i.e., blocks $202_2$-$202_N$) results from hashing input that comprises data 204 of a block as well as hash value 210 of the previous block. For example, the hash value $210_2$ is the output of a hash function, where the input of the hash function comprises data $204_2$ and hash value $210_1$. Because the input that results in hash value 210 comprises hash value 210 of the previous block, the structure of blockchain 106 can be authenticated and validated. If a malicious entity attempts to modify data 204 of any block 202 of blockchain 106, the modification will be noticed through a comparison of the hash value 210 of that block and a recalculation of hash value 210 using the same hash function and the same inputs as used for obtaining hash value 210 stored in that block. A copy of blockchain 106 containing an unauthorized modification is discarded through the blockchain consensus mechanism, and the copy is replaced by a copy without the unauthorized modification.

Each block 202 comprises a pointer 212, which may be an address within a memory or storage containing the copy of blockchain 106. The first block of the blockchain 106 (i.e., block $202_1$) contains the pointer $212_1$, which points to the location in storage or memory containing the next block of the blockchain 106 (i.e., block $202_2$). The last block of blockchain 106 (i.e., block $202_N$) has pointer 212 with a null value, or alternatively, does not have pointer 212.

Figure 3A:
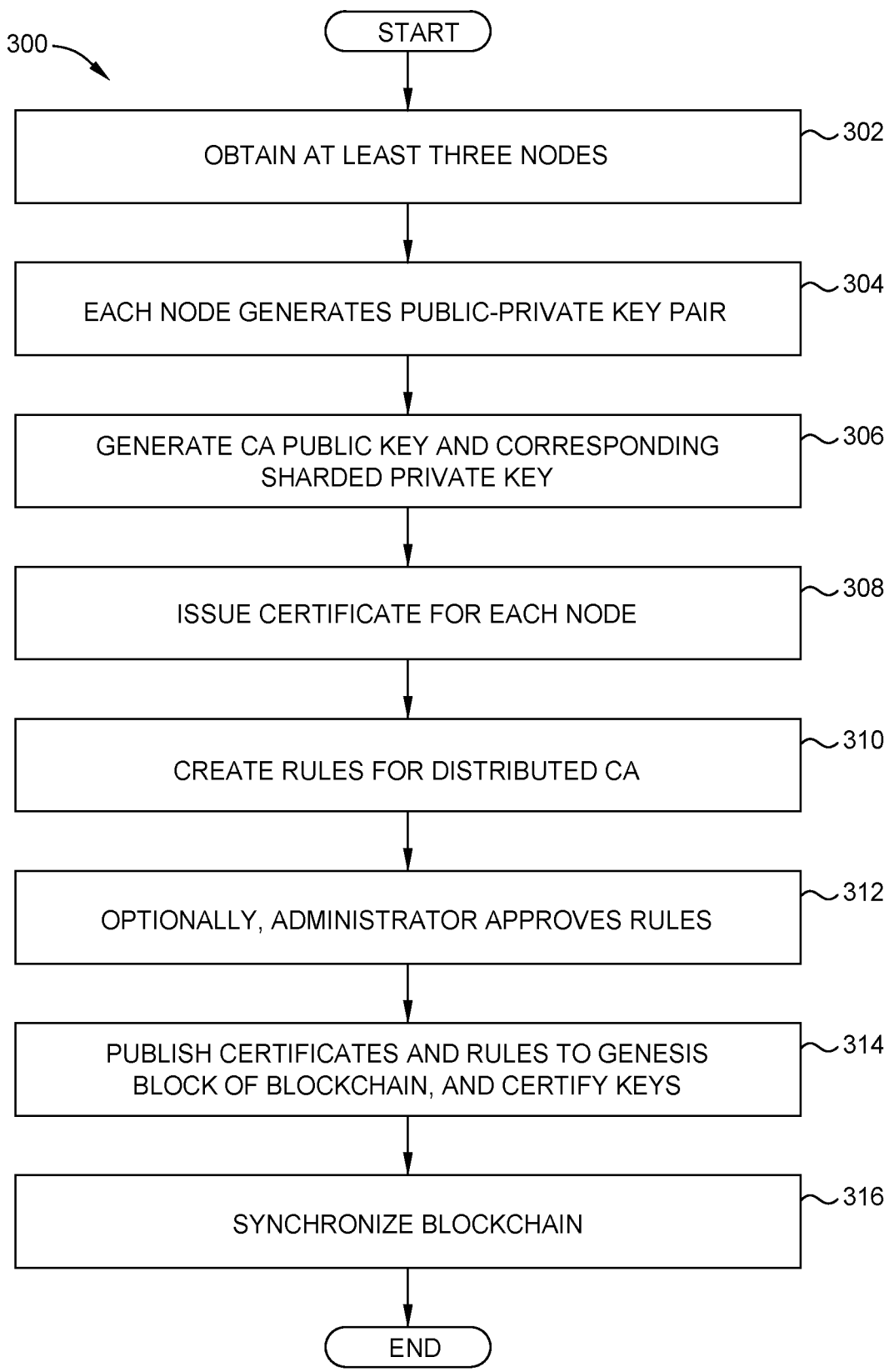
FIG. 3A depicts a flow diagram of a method of creating a distributed certificate authority, according to an embodiment.

FIG. 3A depicts a flow diagram of a method 300 of creating a distributed CA 102, according to an embodiment. The distributed CA 102 created by the method 300 may be referred to as a "genesis" distributed CA 102. As used herein, a "genesis" distributed CA 102 is a network of blockchain nodes 104, with each node comprising a sharded CA private key 114, as further described below.

At step 302, at least three blockchain nodes 104 are chosen for the creation of distributed CA 102. The blockchain nodes 104 chosen at step 302 may be referred to as "genesis blockchain nodes" 104. The number of blockchain nodes 104 chosen may conform to the following *Byzantine* Fault Tolerance formula, where "F" stands for "failure tolerance:"

Number of Genesis Nodes=2*F*+1

Failure tolerance is the number of chosen blockchain nodes 104 whose failure may be tolerated in order for the distributed CA 102 to issue a certificate 116, as further explained below with reference to step 306. An example of failure of a blockchain node 104 is loss of network connectivity of blockchain node 104.

For example, if out of the nodes chosen at step 302, two nodes can be allowed to fail (i.e., not needed to issue a certificate 116), then the minimum number of nodes chosen is five, because 2*2+1=5. If out of the nodes chosen at step 302, one nodes can be allowed to fail, then the minimum number of nodes chosen is three, because 2*1+1=3.

At step 304, each blockchain node 104 chosen at step 302 generates a unique private-public key pair 120. Each private-public key pair 120 is unique as compared to every other private-public key pair 120 within system 100. Private-public key pair 120 may be generated using cryptographic algorithms to produce one-way functions. As is known in the art, the public key of the private-public key pair 120 may be disseminated widely and be publicly available, while the private key of the private-public key pair 120 is known only to the owner of the private-public key pair. Effective security of a system that uses private-public key pairs 120 requires keeping the private key private and unknown by non-owners.

For example, if at step 302 three nodes are chosen, then at step 304, blockchain node $104_1$ may generate private-public key pair $120_1$, blockchain node $104_2$ may generate private-public key pair $120_2$, and blockchain node $104_N$ may generate private-public key pair $120_N$.

Private-public key pair 120 may be used for authentication of a component of distributed CA 102. For example, device 112 may combine a message with a private key to create a digital signature on the message. Another component, such as access point 108, may combine the public key of device 112 with the signed message to verify that the signature was made by a private key corresponding to the public key that signed the received message. A signature of a message using a private key of a private-public key pair 120, 320 may be formulaically illustrated by the following, where "h" is a function, "pr" is a private key, and "pub" is the corresponding public key of a private-public key pair 120:

signature using private key=$h(pr,\text{message}))$

However, this is just one example of a suitable signature. The embodiments herein are not limited to these examples and can be used with any technique for using private-public key encryption.

A signature or encryption of a message using a public key of a private-public key pair 120, 320 may be formulaically illustrated by the following:

signature or encryption using public key=$h(\text{pub},\text{message}))$

Figure 3B:
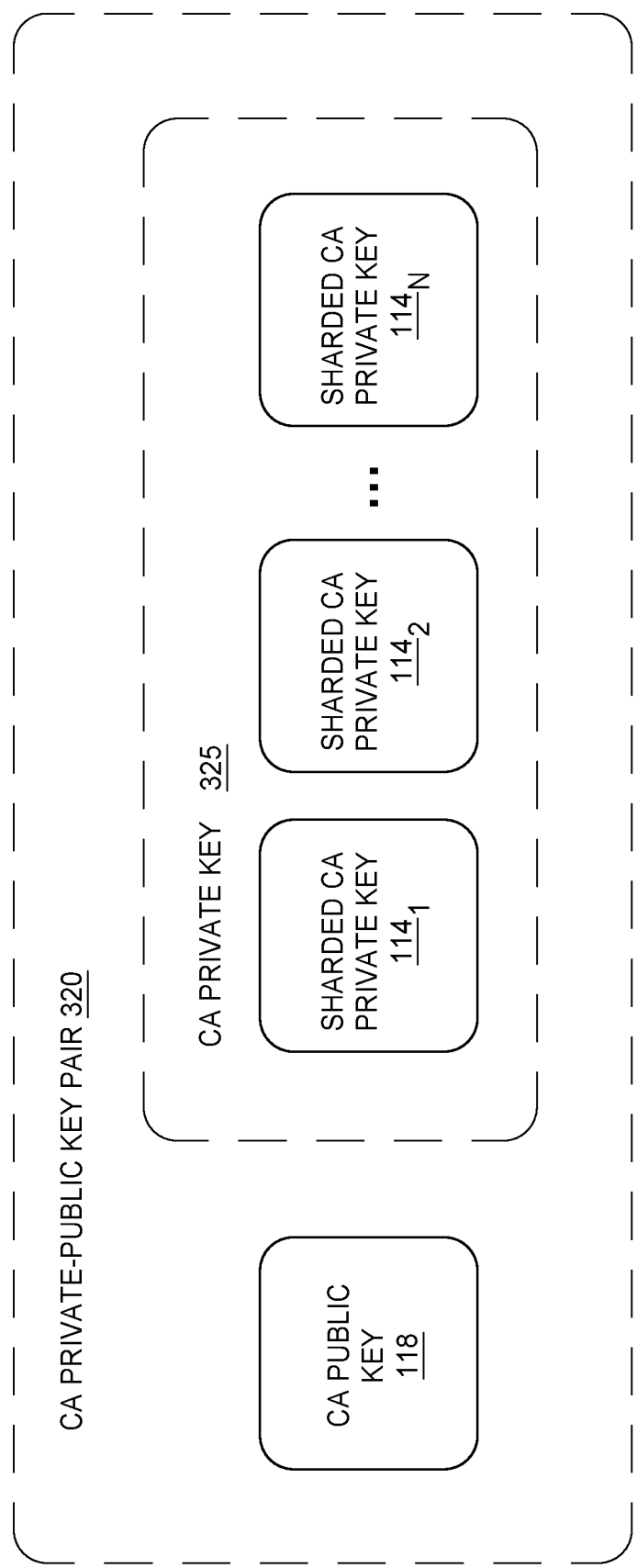
FIG. 3B depicts a block diagram of a certificate authority private-public key pair, according to an embodiment.

The relationship between a private and a public key of a private-public key pair 120, as well as way of deriving a message from a signature by using either a private or public key, may be illustrated formulaically by the following equivalencies:

$h(pr,h(\text{pub},\text{message}))$===$h(\text{pub},h(pr,\text{message}))$===message At step 306, the at least three blockchain nodes 104 chosen at step 302 a CA private-public key pair 320 (see FIG. 3B). CA private-public key pair 320 is for the distributed CA 102 as a whole. Step 306 is described with reference to FIG. 3B.

FIG. 3B depicts a block diagram of a CA private-public key pair 320, according to an embodiment. CA private-public key pair 320 comprises CA public key 118 and CA private key 325. CA public key 118 and CA private key 325 function similarly to private-public key pair 120, described above.

The CA private key 325 is generated in pieces (e.g., Distributed Key Generation), such that each of the at least three genesis blockchain nodes 104 generates a portion of the CA private key 325, and each of the at least three genesis blockchain nodes 104 is not aware of what are the other portions of the CA private key 325. As used herein, the portion of the generated private key may be referred to as "sharded CA private key" 114. Each sharded CA private key 114 is kept secret from every component of system 100 except the blockchain node 104 that generated that portion of the CA private key 325.

Sharded CA private keys 114, when combined together, constitute the equivalent of CA private key 325. Each sharded CA private key 114 may be generated based on the *Byzantine* Fault Tolerance formula of step 302, such that only a "threshold number" of sharded CA private keys 114 are needed in order to issue a signature that is equivalent to a signature using CA private key 325. That is, in order to sign data (e.g., issue a certificate 116), the number genesis nodes 104 that need to sign using their respective sharded CA private keys 114 is the number of genesis blockchain nodes 104 minus "F" from the *Byzantine* Fault Tolerance formula of step 302. F is the number of genesis blockchain nodes 104 whose failure can be tolerated. F is the number of genesis blockchain nodes 104 whose sharded CA private keys 114 are not needed to issue a signature that is equivalent to signing with CA private key 325. The term "threshold number" of genesis blockchain nodes 104 is the minimum number of genesis blockchain nodes 104 that need to provide partial signatures using their respective sharded CA private keys 114. The combined partial signatures are used to issue a full signature that is equivalent to a signature using CA private key 325. The threshold number may be represented by the following formula:

Threshold number=number of genesis nodes–$F$

For example, if F is one and the number of genesis blockchain nodes 104 is three, then two genesis blockchain nodes 104 need to provide their respective partial signatures. The result of signing data with two partial signatures is a full signature that is equivalent to signing data using CA private key 325.

Each sharded CA private key 114 may be generated using a process known in the art, such as Shamir Secret Sharing and Distributed Key Generation.

In another embodiment, another cryptographic method can be used where shards from, e.g., (t, k)), are securely redistributed to (s, j) where (s, j) maintains the 2F+1 property and t does not equal s and k does not equal j.

In an embodiment, once the CA private key 325 has been generated in shards 114, no more sharded CA private keys 114 of CA private key 325 can be created. However, an existing sharded CA private key 114 may be further sharded into portions of sharded CA private key 114. A portion of a sharded CA private key 114 may be referred to as a "sub-shard" of the CA private key 114. Sub-sharding a sharded CA private key 114 is further discussed below with reference to step 418 of method 400. Each sharded CA private key 114 may be further sub-sharded using a process known in the art, such as Shamir Secret Sharing and Distributed Key Generation.

At step 308, distributed CA 102 issues a certificate 116 for each genesis node 104. As is known in the art, certificate 116, also known as a public key certificate, a digital certificate, or an identity certificate, is an electronic document used to prove the ownership of a public key of a private-public key pair 120, 320. The certificate may include information about the public key, information (e.g., identifier) about the identity of the owner of the public key, and a digital signature of the certificate issuer (e.g., distributed CA 102) that has verified the certificate's contents.

The signature on issued certificate 116 may be provided using some or all sharded CA private keys of 114 of genesis blockchain nodes 104, as required by the *Byzantine* Fault Tolerance formula of step 302. For example, for distributed CA 102 to issue a certificate 116$_1$ to blockchain node 104$_1$, distributed CA 102 chooses a combiner to collect partial signatures from holders of sharded CA private keys 114. Each holder (e.g., blockchain node 104) of sharded CA private key 114 may issue a partial signature for the purpose of issuing a certificate 1161 to blockchain node 1041. The holder signs, by placing data as parameters into a signing function. The data may include some or all of (a) the public key or information about the public key of the private-public key pair 120$_1$ of blockchain node 104$_1$, and/or (b) identifier of the blockchain node 104$_1$. An additional parameter is the sharded CA private key 114 of the signer. A partial signature may be represented by the following formula, where h is the signing function:

$$\text{Partial Signature}=h(\text{data},\text{sharded } CA \text{ private key})$$

The combiner may be any component of distributed CA 102, such as one or more of devices 112, blockchain nodes 104, or access point 108. Upon determining, by the combiner, that the combiner has collected the threshold number of partial signatures, the combiner assembles a full signature from the partial signatures, by placing the partial signatures as parameters into a signing function. The full signature may be represented by the following formula, where h is the signing function:

$$\text{Full Signature}=h(\text{collected partial signatures})$$

Data (e.g., public key entity 122 and/or identifier of entity 122) and the full signature may then be placed in an electronic document, and the electronic document may be issued to the blockchain node 104$_1$ as the certificate 116$_1$. In one embodiment, the electronic document (e.g. X.509 certificate) is added to the blockchain by the combiner as a transaction object; the smart contracts can verify the electronic document has the correct signature just like typical PKI to accept the transaction. As such, the blockchain has a similar function as a "phonebook" that publishes certificates/public keys. Further updates to this state are how status changes (e.g. revocation) are likewise achieved.

As used herein, the process of collecting a threshold number of partial signatures and signing using the collected partial signatures may be referred to as (a) signing by or with CA private key 325, and/or issuing a full signature. As used herein, the terms "signing by CA private key 325" and "issuing a full signature" are synonymous.

At step 310, the distributed CA 102 and/or an administrator create rules (not shown) by which distributed CA is to function. The rules may be immutable and unchangeable, and if the rules are changeable, then the rules may include a set of rules for changing the rules. The rules may include rules for: joining distributed CA 102, obtaining a certificate 116 by entity 122, becoming a blockchain node 104, maintaining a valid certificate 116, changing the rules, etc. The rules for obtaining certificate 116 by entity 122 that is applying to be a blockchain node 104 may be different from rules for obtaining a certificate 116 by entity 122 that is applying to be a device 112. Rules for obtaining a certificate 116 or becoming a blockchain node 104 may vary, and may be, for example: a majority or supermajority vote of holders of a sharded CA private key 114, the payment of cryptocurrency, the knowledge of a password, the embedding of certain code in software of entity 122, etc. In an embodiment, the rules may be implemented into one or more smart contracts that may be executed upon occurrence of specific trigger events.

At step 312, one or more administrators of distributed CA 102 may approve the rules of step 310. Step 312 is optional.

At step 314, (a) data from steps 302 through 312 is placed into a block 202 of blockchain 106, (b) the CA certifies and adds public keys to the ledger and may assign roles to them. One such role for a public key is the right to sign blocks. In one embodiment, this is the orderer key and is used by the consensus based ordering service to assemble and sign blocks. Further, at step 314, the block 202 is published on the blockchain 106 by adding the block 202 to the blockchain 106. The block 202 may be a "genesis" block of blockchain 106, meaning that the block 202 may be the first block 202 of blockchain 106.

The data of block 202 may include some or all of the following: identifiers of the genesis blockchain nodes 104, public keys of the genesis blockchain nodes 104, CA public key 118, certificates 116 issued to each genesis blockchain nodes 104 at step 308, and rules generated at step 310. In an embodiment, the data of block 202 described above may be published to blockchain 106 within more than one block 202, each block 202 being signed by the CA private key 325.

The publishing to the blockchain 106 may be performed, for example, by the combiner that collected partial signatures for the signing of the block 202, or by any of the blockchain nodes 104. The publishing is done to one of the copies of the blockchain 106.

At step 316, copies of the blockchain 106 are synchronized based on consensus reached by the consensus mechanism of blockchain 106. After step 316, the method 300 ends.

Figure 4:
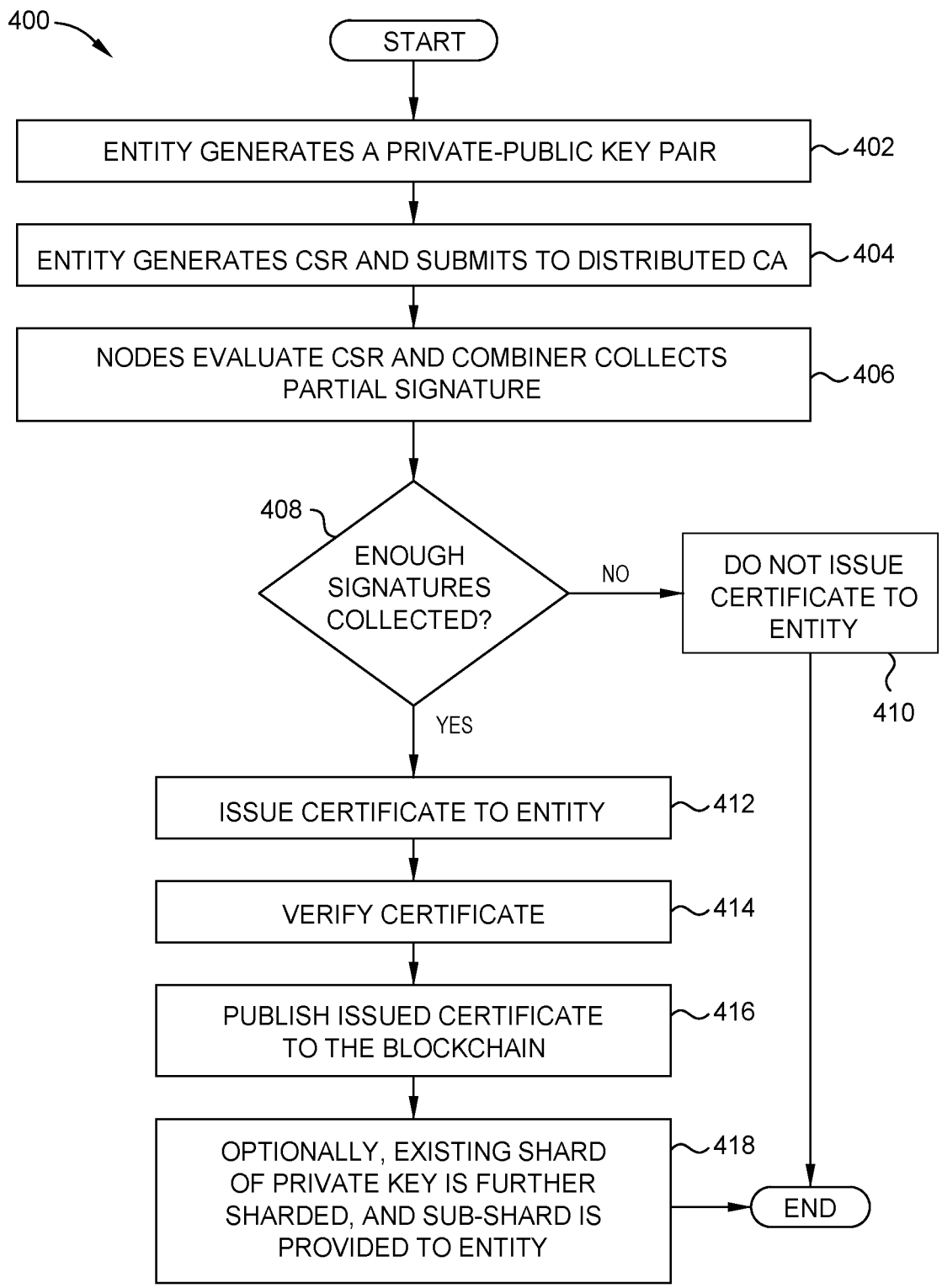
FIG. 4 depicts a flow diagram of a method of joining the distributed certificate authority by an entity, according to an embodiment.

FIG. 4 depicts a flow diagram of a method 400 of joining the distributed CA 102 by the entity 122, according to an embodiment.

At step 402, the entity 122 generates a private-public key pair 120. Step 402 is similar to the generation of a private-public key pair 120 for each blockchain node 104 at step 304 of the method 300.

At step 404, the entity 122 generates a Certificate Signing Request (CSR) and submits to the distributed CA 102. The CSR is an application to apply to join the distributed CA 102. The CSR contains the public key of the entity 122, and may contain additional information, such as information that is to be compared to the rules (e.g., rules generated at step 310) of distributed CA 102 for entity 122 joining distributed CA 102. Contents of the CSR may be at least in part based on the rules of distributed CA 102. Contents of the CSR may be at least in part based on whether the entity 122 is applying to join as a device 112 or as a blockchain node 104. The entity 122 may communicate with the distributed CA 102 through access point 108 or a gateway. As part of step 404, the CSR is distributed throughout distributed CA 102 to one or more components that are to analyze or evaluate the CSR.

At step 406, components of distributed CA 102 evaluate the CSR. The components may be, for example, components that are holders or owners of sharded CA private keys 114. If the component determines that the CSR meets criteria for joining distributed CA 102, as per the rules of the distributed CA 102, then the component issues a partial signature using its sharded CA private key 114, wherein the data for the partial signature may include (a) the public key or information about the public key of the entity 122, (b) identifier of the entity 122, and/or (c) CSR submitted by entity 122. The component then transmits its partial signature to a designated combiner of partial signatures. The combiner collects partial signatures from holders of sharded CA private keys 114, similar to the collecting described in step 308 of the method 300. The combiner may be any component of distributed CA 102, such as one or more of devices 112, blockchain nodes 104, or access point 108.

At step 408, the combiner compares the partial signatures collected to the threshold number, and the combiner determines whether enough partial signatures have been collected to issue a full signature. Step 408 is performed at an appropriate time or point of the method 400. For example, each holder of sharded CA private key 114 may be given a time period by which a partial signature must be provided, and at the end of that time period, step 408 may be performed. If the number partial signatures collected does not satisfy the threshold number, then the method 400 continues to step 410. If the number of partial signatures collected satisfies the threshold number, then the method 400 continues to step 412.

At step 410, the distributed CA 102 does not issue a certificate 116 to entity 122, and entity 122 does not join distributed CA 102. After step 410, the method 400 ends.

At step 412, the distributed CA 102 issues a certificate 116 to entity 122. The issuance is similar to the issuance of a certificate 116 described at step 308 of the method 300. The combiner issues a full signature by placing the partial signatures as parameters into a signing function. Data (e.g., public key entity 122, identifier of entity 122, and/or CSR submitted by the entity 122) and the full signature may then be placed in an electronic document, and the electronic document may be issued to the entity 122 as a certificate 116.

At step 414, the issued certificate is verified. For example, a certificate can be verified using the public key of the CA published public key described in its self-signed certificate, which is trusted by all parties involved in the blockchain. To the outside observer, the certificate bearing the CA signature from the public key (as opposed to its private half) is no different than if the CA had issued the certificate directly without the sharding described above.

At step 416, the issued certificate 116 is published to blockchain 106 by a process similar to that described at step 314 of the method 300. Data from steps 302 through 312 is placed into a block 202 of blockchain 106, the block 202 is signed by CA private key 325 by combining partial signatures to issue a full signature, and the block 202 is added to the blockchain 106.

The data of block 202 may include some or all of the following: (a) the public key or information about the public key of the entity 122, (b) identifier of the entity 122, and/or (c) CSR submitted by entity 122. In one embodiment, role-based access control (RBAC) can be used to provide selective data disclosure. For example, with RBAC, the CSR may be visible only to the auditor role. Otherwise, unauthorized entities could download the CSR from the blockchain and resubmit to the CA to receive an updated certificate (e.g. valid start/end times could be refreshed). A malicious actor would lack the private key of the original entity submitting the CSR which must be signed using that private key to prove possession to the CA. But the existing CSR was already signed. In an embodiment without RBAC selective data disclosure, the CA rules could reject a CSR that is older than some time limit—e.g. a timeframe smaller than the window required for a transaction containing the original CSR to be published throughout the blockchain as one of its rules.

Publishing to the blockchain 106 may be performed, for example, by the combiner or by any of the blockchain nodes 104. The publishing is done to one of the copies of the blockchain 106. As part of step 416, the copies of blockchain 106 are synchronized based on consensus reached by the consensus mechanism of blockchain 106.

At step 418, entity 122 joins distributed CA 102. Entity 122 may join as device 112 or as blockchain node 104. If the entity 122 joins as blockchain node 104 or otherwise as a node that is to issue partial signatures, then entity 122 may need a portion or sub-shard of one of the sharded CA private keys 114.

Sharding a sharded CA private key 114 may adhere to the *Byzantine* Fault Tolerance formula discussed above. For example, if the failure tolerance for the sub-shards is two, then the minimum number of nodes among which the sub-shards are to be distributed is three, because 2+1=3. When a sharded CA private key 114 is sub-sharded, the original owner of the sharded CA private key 114 obtains a sub-shard, and the other sub-shards are distributed among other nodes, such as newly joined entity 122, and other nodes 104 and/or devices 112.

Upon joining the distributed CA 102, the entity 122 may need to wait until one or more additional entities 122 join, so that the sub-sharding process may occur in conformance with the *Byzantine* Fault Tolerance formula. While the following paragraphs discuss further sharding previous shards, in another embodiment shard redistribution can be used that permits redistributing N shards into M shards, where N does not equal M, and M satisfies the 2F+1 construction. This may also be known as "share redistribution".

It should be noted that partial signatures of sub-shards of a sharded CA private key 114, when combined, can at most issue a partial signature that is the equivalent of a partial signature issued by the sharded CA private key 114. That is, a partial signature issued by a sub-shard is not equivalent in "voting" weight to a partial signature issued by a sharded CA private key 114. Combining only sub-shards of a sharded CA private key 114 cannot result in issuance of a full signature, and can at most result in issuance of a partial signature that is equivalent to a partial signature issued by a sharded CA private key 114.

As part of step 418, one of the sharded CA private keys 114 may be sub-sharded, with a sub-shard being provided to the newly joined entity 122, a sub-shard being assigned or provided to the original owner of the sharded CA private key 114 that has been sub-sharded, and a sub-shard being assigned to (a) another entity 122 that has previously joined the distributed CA 102, and/or (b) one of device 112.

Also as part of step 418, the newly joined entity 122 may obtain a copy of blockchain 106. After step 418, the method 400 ends.

Figure 5:
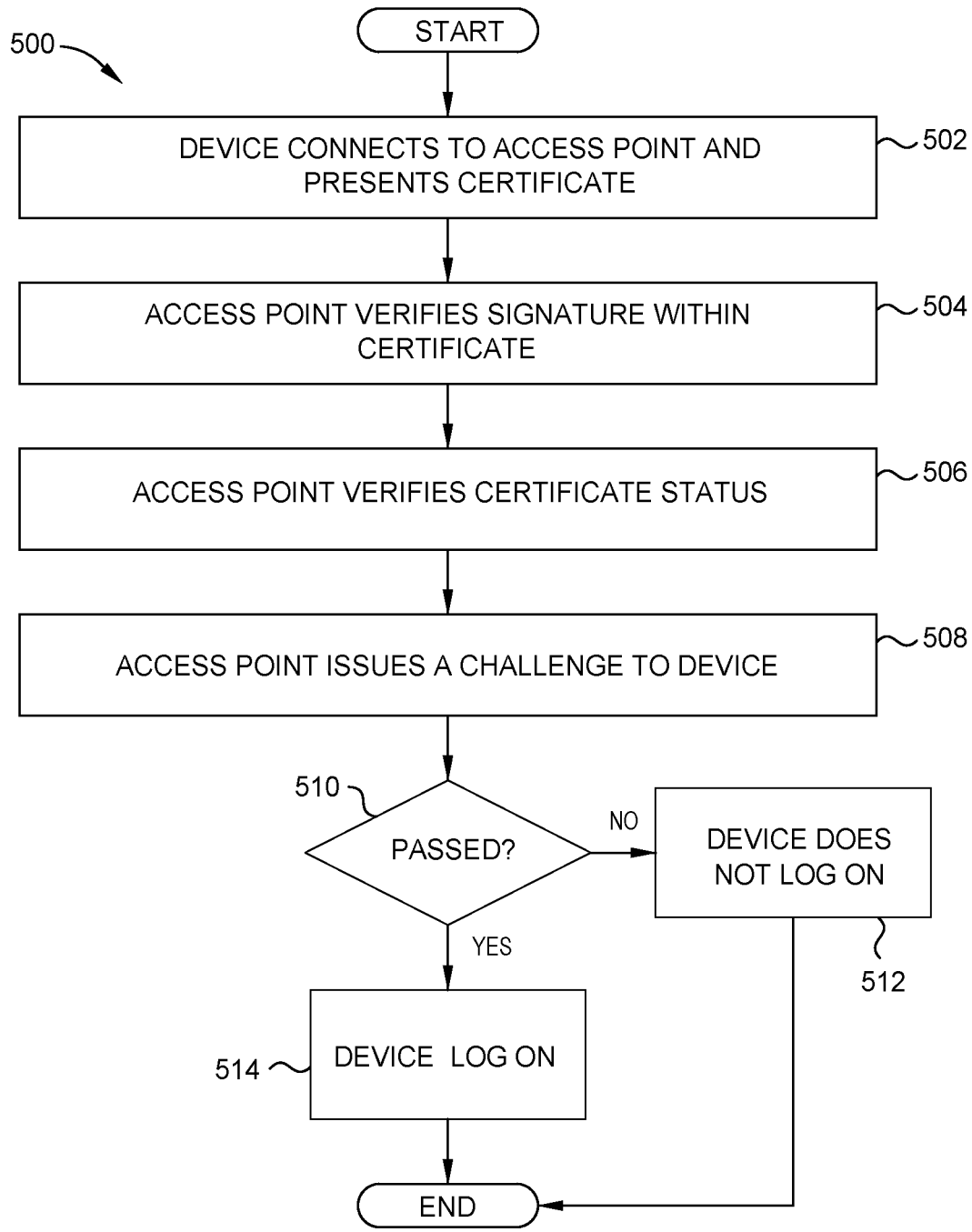
FIG. 5 depicts a flow diagram of a method of logging into the distributed certificate authority, according to an embodiment.

FIG. 5 depicts a flow diagram of a method 500 of logging into the distributed CA 102, according to an embodiment. The method 500 applies to logging in by entity 122 that has previously obtained a certificate 116, such as through the method 400. Although the method 500 is described with reference to device 112, method 500 is applicable to logging in by one of blockchain nodes 104 or by another component of the distributed CA 102 that has previously received a certificate 116, such as by the method 400.

At step 502, one of the devices 112 connects to the access point 108. As part of step 502, the device 112 presents its certificate 116.

At step 504, the access point 108 verifies the signature within the certificate 116. The signature may be verified by passing into the signature verification function, as parameters, the signature and the CA public key 118. In one embodiment, the signature verification function returns the data that was signed by partial signatures at step 406 of the method 400. If the returned data is not the data that was signed by partial signatures at step 406, then the signature within the certificate is not verified and the method 500 may skip to step 512. The signature verification may be represented by the following formula, where "pub" is the CA public key 118. However, the embodiments herein are not limited to any particular signature verification function.

Data Signed by Partial Signatures=$h$(pub,signature)

At step 506, the access point 108 verifies status of certificate 116 of device 112 that is logging in. Status of certificate 116 may be verified to checking blockchain 106 for data indicating that certificate 116 of device 112 is no longer valid. If status of certificate 116 is not valid, then method 500 may skip to step 512.

At step 508, the access point 108 issues a challenge to the device 112. Step 508 is optional. The challenge may include requesting the device 112 to sign a nonce using the private key of the device 112. This challenge is often referred to as proof of possession (of the private key) which is performed without revealing the private key, e.g., a zero knowledge proof of possession. The device 112 then sends the signature to the access point 108, and the access point 108 can decrypt the nonce by using the public key of the device 112. If the access point 108 cannot decrypt the received signature using the public key of the device 112 to obtain the nonce, then the device 112 does not log in and the method 500 may skip to step 512.

At step 510, the access point 108 determines whether the device 112 has passed steps 504, 506, and 508 (if step 508 was performed). If the device failed any of the performed steps 504, 506, 508, then the method 500 continues to step 512. If the device passed all performed steps 504, 506, 508, then the method continues to step 514.

At step 512, the device 112 is not allowed to log in to the distributed CA 102. After step 512, the method 500 ends.

At step 514, the device 112 is allowed to log in to the distributed CA 102. After step 514, the method 500 ends.

The techniques discussed herein are applicable to several use cases. In the first use case, a subnetwork may be located on the "edge" or the "fog" of a network. For example, an oil rig may be located several miles out in the ocean, may have its own local network, but may have low or intermittent connectivity to a larger network, such as the Internet (e.g. during a storm). If the oil rig's subnetwork would like to add a device, reaching a centralized CA over the Internet may be problematic. However, if the oil rig has sufficient nodes 104 within its local network, then these local nodes may be able to evaluate and certify the new device without Internet connectivity on the localized subnetwork ledger, and then the new device would be communicated to the overall blockchain 106, located on devices outside of the oil rig, through some synchronization once Internet connectivity is restored.

In the second use case, a supply chain may consist of several independent databases, each maintained by separate entities. If an error occurs in the supply chain process, the error investigation is time consuming and costly due to the separate, disconnected, distinct databases. For efficiency, the distinct databases may be combined into a single "consortium" database. However, if the certificates of the consortium had a centralized CA, then the risk of being excluded from the consortium due to unilateral action of one of an existing member may be high. A consortium with a distributed CA, in which rules are defined and enforced by smart contracts and each member has equal authority, lowers risk of excluding new members and improves fairness.

The third case may be an extension of the second case. In the consortium, some entities may be, for example, manufacturers. The manufacturers may leverage the blockchain database, on which the distributed certificates are stored, to register components of devices as those components are built by the manufacturers. Later, when a full device is built, the device is validated by checking that some or all of its components are the expected components, as recorded previously in the blockchain 106. The component verification process may be an additional layer in authenticating a device before a digital certificate is issued to that device.

A fourth use case is virtually combining multiple external identity frameworks and issuing (from a network or blockchain perspective) a common identity understood by all participants of the network or blockchain (i.e., by all participants of distributed CA 102). For example, a smart contract could authenticate a user's device via the device's external enterprise authentication authorization auditing (AAA) mechanism (e.g. Lightweight Directory Access Protocol (LDAP), Kerberos, X.509, etc.), and then issue to the device an X.509 blockchain identity which is managed and revoked via smart contracts.

Another use case is to create additional distributed CAs as "intermediate" distributed CAs. The intermediate distributed CAs are issued certificates by the "root" distributed CA 102. The intermediate distributed CAs may be used to govern an identity domain (e.g. one enterprise organization and all of its employees) in a blockchain consortium of multiple enterprises and their respective external identity sources. The private key of a distributed Intermediate CA can (not must) be similarly sharded amongst random nodes 104, but only nodes belonging to the respective enterprise (i.e. a jurisdiction) to mitigate side-channel attacks enabled from visibility of identity issuance and CA key usage.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of creating a distributed certificate authority (CA) on a network, the network comprising a blockchain and at least three nodes, wherein the at least three nodes comprise a first node, a second node, and a third node, the method comprising:

generating a private key and a public key of a private-public key pair, wherein the generating comprises:

generating a first shard of the private key and storing the first shard on the first node;

generating a second shard of the private key and storing the second shard on the second node;

generating a third shard of the private key and storing the third shard on the third node;

issuing a first certificate to the first node, a second certificate to the second node, and a third certificate to the third node, wherein the first shard and the second shard, but not the third shard, are used to issue the first certificate;

publishing the first, second, and third certificates on the blockchain;

registering, subsequent to the publishing, an entity to the network by issuing a fourth certificate to the entity, wherein the fourth certificate is signed by some but not all of the shards of the private key; and logging in, by the entity, to the network by:

presenting, by the entity, the fourth certificate to an access point of the network;

verifying, using the public key of the private-public key pair, the fourth certificate; and verifying the fourth certificate by accessing the blockchain.

2. The method of claim 1, wherein the registering further comprises:

collecting one or more partial signatures obtained from one or more shards of the private key until at least a threshold number of partial signatures has been collected but not all of the partial signatures of the network have been collected; and issuing a full signature of the private key on the fourth certificate by using the at least a threshold number of partial signatures but not all of the partial signatures of the network.

3. The method of claim 1, further comprising one of:

sharding the first shard of the private key into at least three sub-shards, and assigning each of the at least three sub-shards to a second at least three nodes of the network; or performing shard redistribution that redistributes N shards into M shards.

4. The method of claim 1, further comprising issuing a fifth certificate, by the distributed CA, to a second intermediate distributed CA.

5. A non-transitory computer readable medium comprising instructions to be executed in a processor of a computer system, the instructions when executed in the processor cause the computer system to carry out a method of creating a distributed certificate authority (CA) on a network, the network comprising a blockchain and at least three nodes, wherein the at least three nodes comprise a first node, a second node, and a third node, the method comprising:

generating a private key and a public key of a private-public key pair, wherein the generating comprises:

generating a first shard of the private key and storing the first shard on the first node;

generating a second shard of the private key and storing the second shard on the second node;

generating a third shard of the private key and storing the third shard on the third node;

issuing a first certificate to the first node, a second certificate to the second node, and a third certificate to the third node, wherein the first shard and the second shard, but not the third shard, are used to issue the first certificate;

publishing the first, second, and third certificates on the blockchain;

registering, subsequent to the publishing, an entity to the network by issuing a fourth certificate to the entity, wherein the fourth certificate is signed by some but not all of the shards of the private key; and logging in, by the entity, to the network by:

presenting, by the entity, the fourth certificate to an access point of the network;

verifying, using the public key of the private-public key pair, the fourth certificate; and verifying the fourth certificate by accessing the blockchain.

6. The non-transitory computer readable medium of claim 5, wherein the registering further comprises:

collecting one or more partial signatures obtained from one or more shards of the private key until at least a threshold number of partial signatures has been collected but not all of the partial signatures of the network have been collected; and generating a full signature of the private key on the fourth certificate by combining the at least a threshold number of partial signatures but not all of the partial signatures of the network.

7. The non-transitory computer readable medium of claim 5, further comprising one of:

sharding the first shard of the private key into at least three sub-shards, and assigning each of the at least three sub-shards to a second at least three nodes of the network; or performing shard redistribution that redistributes N shards into M shard.

8. The non-transitory computer readable medium of claim 5, further comprising issuing a fifth certificate, by the distributed CA, to a second distributed CA.

9. A computing system comprising:

a network, the network comprising a blockchain and at least three nodes, wherein the at least three nodes comprise a first node, a second node, and a third node; and at least one processor, wherein the at least one processor is programmed to carry out a method of creating a distributed certificate authority (CA) on the network, the method comprising:

generating a private key and a public key of a private-public key pair, wherein the generating comprises:

generating a first shard of the private key and storing the first shard on the first node;

generating a second shard of the private key and storing the second shard on the second node;

generating a third shard of the private key and storing the third shard on the third node;

issuing a first certificate to the first node, a second certificate to the second node, and a third certificate to the third node, wherein the first shard and the second shard, but not the third shard, are used to issue the first certificate;

publishing the first, second, and third certificates on the blockchain;

registering, subsequent to the publishing, an entity to the network by issuing a fourth certificate to the entity, wherein the fourth certificate is signed by some but not all of the shards of the private key; and logging in, by the entity, to the network by:

presenting, by the entity, the fourth certificate to an access point of the network;

verifying, using the public key of the private-public key pair, the fourth certificate; and verifying the fourth certificate by accessing the blockchain.

10. The computing system of claim 9, wherein the registering further comprises:

collecting one or more partial signatures obtained from one or more shards of the private key until at least a threshold number of partial signatures has been collected but not all of the partial signatures of the network have been collected; and generating a full signature of the private key on the fourth certificate by combining the at least a threshold number of partial signatures but not all of the partial signatures of the network.

11. The computing system of claim 9, further comprising one of:

sharding the first shard of the private key into at least three sub-shards, and assigning each of the at least three sub-shards to a second at least three nodes of the network; or performing shard redistribution that redistributes N shards into M shard.

* * * * *

UNITED STATES PATENT AND TRADEMARK OFFICE
CERTIFICATE OF CORRECTION

PATENT NO. : 11,228,452 B2
APPLICATION NO. : 16/571981
DATED : January 18, 2022
INVENTOR(S) : Jeffrey C. Venable, Sr.

It is certified that error appears in the above-identified patent and that said Letters Patent is hereby corrected as shown below:

In the Specification

Column 7, Line 8, delete "1161" and insert -- $116_1$ --.

Column 7, Line 8, delete "1041." and insert -- $104_1$. --.

Column 10, Line 11, delete "21+1" and insert -- 2*1+1 --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*